(12) United States Patent
Ketcham et al.

(10) Patent No.: US 7,279,241 B2
(45) Date of Patent: Oct. 9, 2007

(54) ELECTROLYTE SHEET WITH A CORRUGATION PATTERN

(75) Inventors: Thomas Dale Ketcham, Big Flats, NY (US); Dell Joseph St Julien, Watkins Glen, NY (US); Sujanto Widjaja, Corning, NY (US); Scott Christopher Pollard, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/157,305

(22) Filed: Jun. 20, 2005

(65) Prior Publication Data

US 2006/0003213 A1    Jan. 5, 2006

(51) Int. Cl.
*H01M 8/00* (2006.01)
*H01M 8/10* (2006.01)
*H01M 4/00* (2006.01)

(52) U.S. Cl. ............... 429/12; 429/30; 429/32; 429/44

(58) Field of Classification Search ......... 429/12, 429/30, 32, 44
See application file for complete search history.

(56) References Cited

U.S. PATENT DOCUMENTS

| 4,135,040 | A | * | 1/1979 | Thornton ............... 429/104 |
| 4,710,227 | A | | 12/1987 | Harley et al. ............. 106/193 |
| 5,085,455 | A | | 2/1992 | Bogner et al. ............. 280/618 |
| 5,230,968 | A | * | 7/1993 | Bones et al. ............... 429/139 |
| 5,273,837 | A | | 12/1993 | Aitken et al. ............... 429/30 |
| 6,428,920 | B1 | | 8/2002 | Badding et al. ............. 429/30 |
| 2001/0044043 | A1 | | 11/2001 | Badding et al. ............. 429/40 |
| 2002/0076593 | A1 | * | 6/2002 | Helfinstine et al. ......... 429/30 |
| 2002/0102450 | A1 | | 8/2002 | Badding et al. ............. 429/32 |
| 2004/0265663 | A1 | | 12/2004 | Badding et al. ............. 429/30 |
| 2004/0265664 | A1 | | 12/2004 | Badding et al. ............. 429/30 |

* cited by examiner

*Primary Examiner*—Dah-Wei Yuan
(74) *Attorney, Agent, or Firm*—Svetlana Z. Short (57) ABSTRACT

An electrolyte sheet comprises a substantially non-porous body and has at least one stress-relief area on at least a portion of the electrolyte sheet. The stress-relief area has a surface with a plurality of folds. The plurality of folds are arranged around and directed longitudinally toward a common central area.

14 Claims, 5 Drawing Sheets

ELECTROLYTE SHEET WITH A CORRUGATION PATTERN

BACKGROUND OF THE INVENTION

1. Field of the Invention

The present invention relates generally to inorganic electrolyte sheets suitable for use in fuel cells and, more particularly to electrolyte sheets with corrugation pattern that compensates for environmentally induced strain.

2. Technical Background

U.S. Pat. No. 4,135,040 describes the use of a corrugated and textured electrolyte to increase ion-conductive surface area. The patent specifies that this electrolyte is suitable for use in sodium-sulfur, sodium-halogen, lithium anode type cells and solid state cells. These types of galvanic "battery" cells utilize solid state electrolytes which conduct positive ions, such as sodium or lithium, which are very mobile at low temperatures. Such solid state electrolytes are typically fairly thick (over 200 micrometers), to maintain good mechanical integrity. This patent does not disclose solid oxide fuel cells, does not describe the thickness of the electrolyte, nor the dimensions of the features on the textured surfaces.

The use of electrolyte materials for solid oxide fuel cells has been the subject of considerable amount of research in recent years. The typical components of a solid oxide fuel cell comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

US Patent Publication US2002/0102450 describes solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials.

US Patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

U.S. Pat. No. 6,428,920 describes a porous nanocrystaline interface roughened layer placed on top of and sintered to the smooth electrolyte sheet (substrate). The porous nanocrystaline roughening layer has a randomly structured surface with submicron surface features (grain size below 1 micron and preferably below 0.5 micrometers) and characterized by the arithmetic average surface roughness of about 0.2 micrometers.

Electrical conductance of the electrolyte is proportional to its material conductance times its thickness. That is, the electrolyte's ohmic resistance depends on material properties of the electrolyte and is proportional to the thickness of the electrolyte. Thus, in order to reduce ohmic resistance and to improve electrical conductance, electrolyte thickness must be as thin as possible. However, reduction in electrolyte thickness results in physical weakening of the electrolyte. Thin electrolyte sheets may break during handling or processing. Furthermore, fuel cells undergo large thermal cycling and large thermal gradients, which induces thermal stresses in the electrolyte sheets. In addition, a mounted electrolyte sheet will expand at a rate that is different from the thermal expansion rate of its frame, which may cause cracking of the electrolyte sheet. A defect in an electrolyte sheet may necessitate a replacement of entire cell or electrolyte device.

SUMMARY OF THE INVENTION

One advantage of the electrolyte sheet of the present invention is that it provides increased multi-axial strain tolerance in an electrolyte sheet while improving or maintaining structural strength and maintaining electrode adhesion and uniform flexing capability.

According to one aspect of the present invention an electrolyte sheet comprises a substantially non-porous body, the electrolyte sheet having at least one stress-relief area on at least a portion of the electrolyte sheet. The stress-relief area has a surface with a plurality of folds. The plurality of folds are arranged around and directed longitudinally toward a common central area.

According to one embodiment of the present invention an electrolyte sheet comprises a substantially non-porous body, the electrolyte sheet having a surface with a multi-axial corrugated pattern on at least a portion of the electrolyte sheet. The corrugated pattern has a plurality of folds surrounding a common central area. Each fold has a longitudinal axis which is directed toward the common central area.

According to one embodiment of the present invention a solid oxide electrode/electrolyte assembly comprises: an electrolyte sheet with a substantially non-porous body, the electrolyte sheet having at least one stress-relief area arranged around a common central area of the electrolyte sheet. The common central area includes: (i) at least one cathode disposed on a first surface of the electrolyte sheet; and (ii) at least one anode disposed opposite the cathode on a second surface of the electrolyte sheet. The stress-relief area has a surface with a plurality of folds. The plurality of folds are arranged around and directed longitudinally toward the common central area.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. One exemplary embodiment of the inorganic electrolyte sheet of the present invention is shown schematically in FIGS. 1 and 2, and is designated generally throughout by the reference numeral 10. The electrolyte sheet 10 is a thin ceramic sheet, with two opposite major surfaces 20, 21 and an average thickness t.

Figure 1:
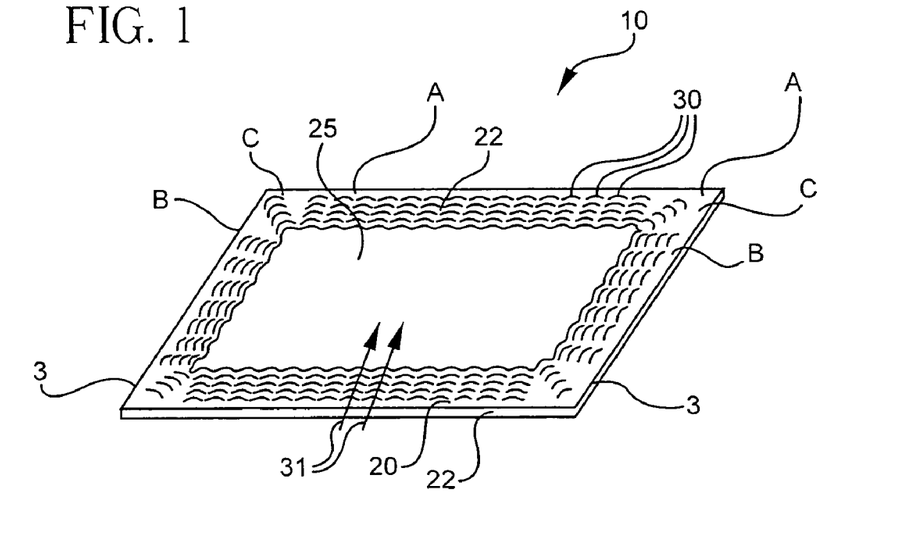
FIG. 1 is a schematic isometric illustration of an exemplary electrolyte sheet of one embodiment of the present invention.
Figure 2:
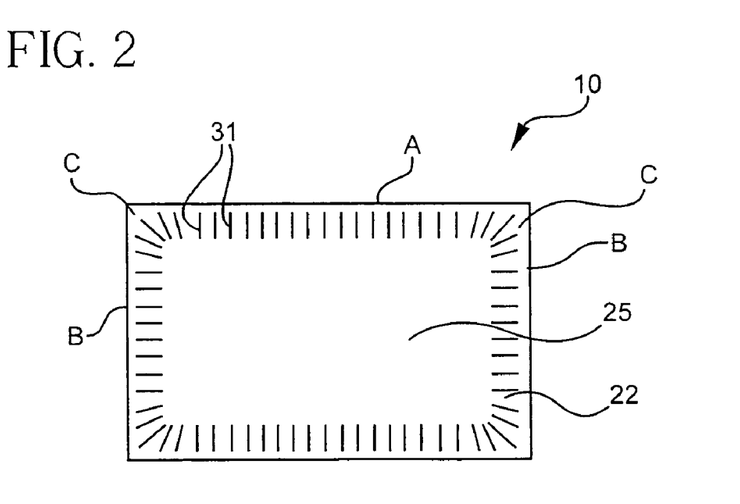
FIG. 2 illustrates schematically a top view of the electrolyte sheet of FIG. 1.
Figure 3:
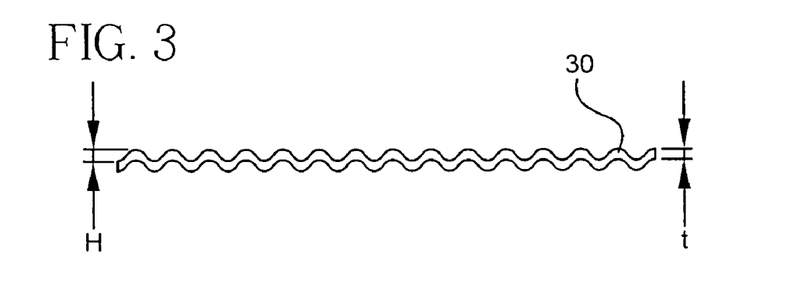
FIG. 3 is a schematic side cross-sectional view of the electrolyte sheet taken substantially along Line 33 of FIG. 1.

The electrolyte sheet 10 comprises a substantially non-porous body and has at least one stress-relief area 22 on at least a portion of the electrolyte sheet 10. The stress-relief area 22 has a plurality of folds 30. The plurality of folds 30 are arranged around and directed longitudinally toward a common central area 25. In this example the electrolyte sheet 10 has a surface with a multi-axial corrugated pattern arranged in a plurality of folds 30 surrounding the common central area 25. It is preferable that the folds 30 be smooth. That is, it is preferable that the folds contain no sharp creases because sharp creases are stress enhancing features. The folds 30 can undulate, for example, the folds may have a wavy or a sinusoidal topology, as shown in FIG. 3. Each fold 30 has a longitudinal axis 31 which is directed toward the common central area 25. In this example, the folds 30 frame the common central area 25, forming a corrugation pattern where the opposing folds have substantially parallel longitudinal axis 31. The folds 30 located near the adjacent sides A and B of the electrolyte sheet 10 have substantially perpendicular longitudinal axis 31. The term "substantially" is used herein to define fold orientation that may deviate from the parallel or perpendicular by up to ±5°. The length of the folds 30 is preferably less than ⅓, more preferably less than ¼, even more preferably less than ⅕ and most preferably less than ⅙ of the width of the electrolyte sheet 10.

Figure 4:
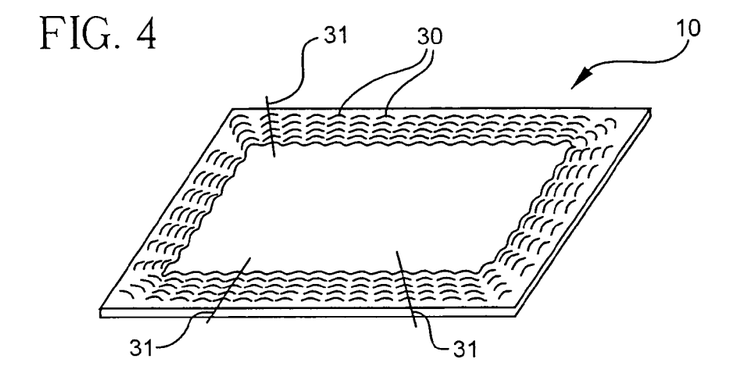
FIG. 4 is a schematic isometric view of a second embodiment of the electrolyte sheet according to the present invention.
Figure 5:
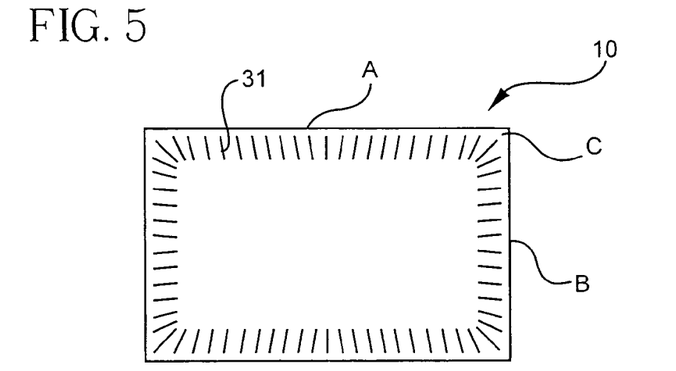
FIG. 5 illustrates schematically a top view of the second embodiment of the electrolyte sheet of FIG. 4.

FIGS. 4 and 5 illustrate schematically the electrolyte sheet 10 of the second embodiment of the present invention. As in the previous embodiment, the stress-relief area of the electrolyte sheet shown in FIG. 4 has a plurality of folds 30. The plurality of folds 30 are arranged around and directed longitudinally toward a common central area 25. In this example the electrolyte sheet 10 has a surface with a multi-axial corrugated pattern arranged in a plurality of folds surrounding a common central area 25. Each fold 30 has a longitudinal axis 31 which is directed toward the common central area 25. In the example depicted in FIG. 4, the folds 30 frame the common central area 25, forming a corrugation pattern where the fold's axis 31 are tilted with respect to one another by more than ±5°.

Figure 6:
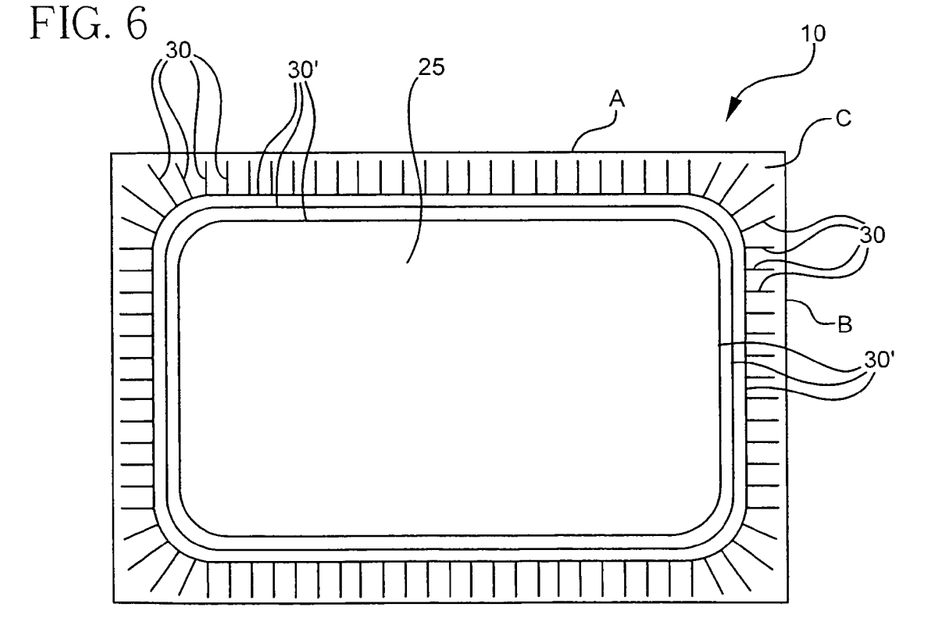
FIG. 6 is a schematic top view of the third embodiment of the electrolyte sheet according to the present invention.

FIG. 6 illustrates schematically then electrolyte sheet 10 of a third embodiment of the present invention. The stress relief area 22 of the electrolyte sheet 10 of this embodiment includes two sets of corrugated patterns surrounding the common central area 25. In this example, the first corrugation pattern (i.e., the pattern closest to the edges of the electrolyte sheet 10) includes a plurality of folds 30 which are arranged around and are directed longitudinally toward the common central area 25. Most of the folds located adjacent to the parallel sides of the electrolyte sheet have substantially parallel longitudinal axis 31. Most of the folds located near the adjacent sides A and B of the electrolyte sheet 10 have substantially perpendicular longitudinal axis 31. The folds 30 which are located near the corners of the electrolyte sheet 10 fan around the corners, so that their longitudinal axis 31 are tilted with respect to one another while being directed toward the common central area 25. The second corrugation pattern corresponds to folds 30' that roughly follow the contours of the edges of the electrolyte sheet 10. More specifically folds 30' surround the common central area 25 and are substantially parallel to one another and to the edges of the electrolyte sheet 10. In this example, the second corrugation pattern has three substantially parallel corrugation folds 30', directly adjacent to and framing the common central area 25.

Figure 7:
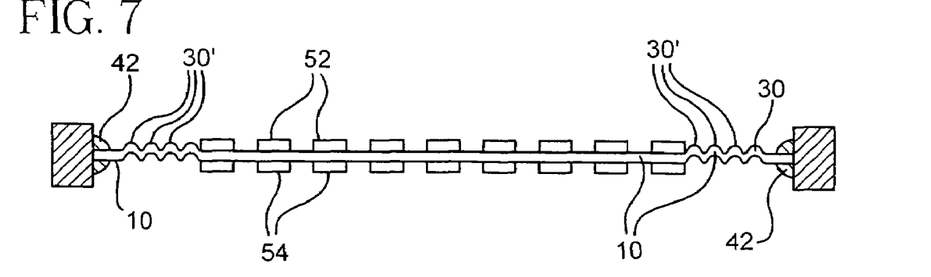
FIG. 7 is a schematic side view of the electrolyte device including the electrolyte sheet of FIG. 6 mounted in a frame.

In a solid oxide fuel sell stack, the electrolyte device (i.e., the electrolyte sheet, anode(s), cathode(s) and other fuel cell component(s)) is mounted in a frame 40 and is sealed with a sealant 42, for example, glass frit (FIG. 7) . FIG. 7 illustrates schematically that in this exemplary embodiment the electrolyte sheet 10 is much thinner than the frame 40. When the frame 40 and the seal material have expansion coefficients that closely match that of the electrolyte sheet 10 (i.e., the difference in CTE is about $0.2 \times 10^{-6}$ or less), and if the temperature is increased or decreased slowly, such that there is no more than 50° C. difference in the temperature between the electrolyte sheet 10 and the frame 40, the second set of corrugation corresponding to the folds 30' is preferred, because folds 30' accommodate the expansion differences between the electrodes, current collectors, the electrolyte sheet as well as the frame and the seal.

If the frame 40 and the seal material have expansion coefficients that do not closely match that of the electrolyte sheet 10, and/or if the temperature is changes rapidly, such that there is more than 50° C. difference in temperatures between the electrolyte sheet 10 and the frame 40, the first set of corrugations is preferred, because folds 30 better accommodate large expansion and/or temperature differences between the frame 40 and the electrolyte sheet 10. The combination of two corrugation patterns is most preferable because they reduce the stresses and the spatial extend of the stresses throughout the electrolyte sheet. More specifically, as the temperature of the fuel cell device goes up, the thin electrolyte sheet 10 heats faster than the relatively thick frame 40. When the electrolyte sheet 10 is hot, while the frame 40 is relatively cool, the electrolyte sheet without the stress relief area(s) (i.e., without folds 30) would experience a large amount of tensile strain in the areas near the frame 40. However, upon cooling, the electrolyte sheet 10 that has strain relief area(s) 22 in accordance with the present invention releases this strain/stress, for example, via an increase in the height of the folds 30. Similarly, when the fuel cell device is cooling rapidly, the electrolyte sheet 10 cools faster than the frame 40, so that while the frame 40 stays hot while the electrolyte sheet 10 is relatively cool. However, the electrolyte sheet 10 with the strain relief area(s) 22 releases this strain/stress via flattening (i.e., decrease in the height) of the folds 30.

It is noted that matching the CTE of the frame 40, electrolyte sheet 10 and the seal material helps to relieve thermal stresses during steady state temperature conditions, but this is not enough to compensate for the unequal temperatures of the frame 40 and the electrolyte 10 during large and rapid thermal fluctuations.

The common central area 25 of the electrolyte sheet 10 may include: (i) at least one cathode disposed on a first surface of the electrolyte sheet; and (ii) at least one anode disposed opposite the cathode on a second surface of the electrolyte sheet. One of embodiments of the present invention includes a plurality of anodes and a plurality of cathodes disposed on opposing sides of the electrolyte sheet 10.

Figure 8:
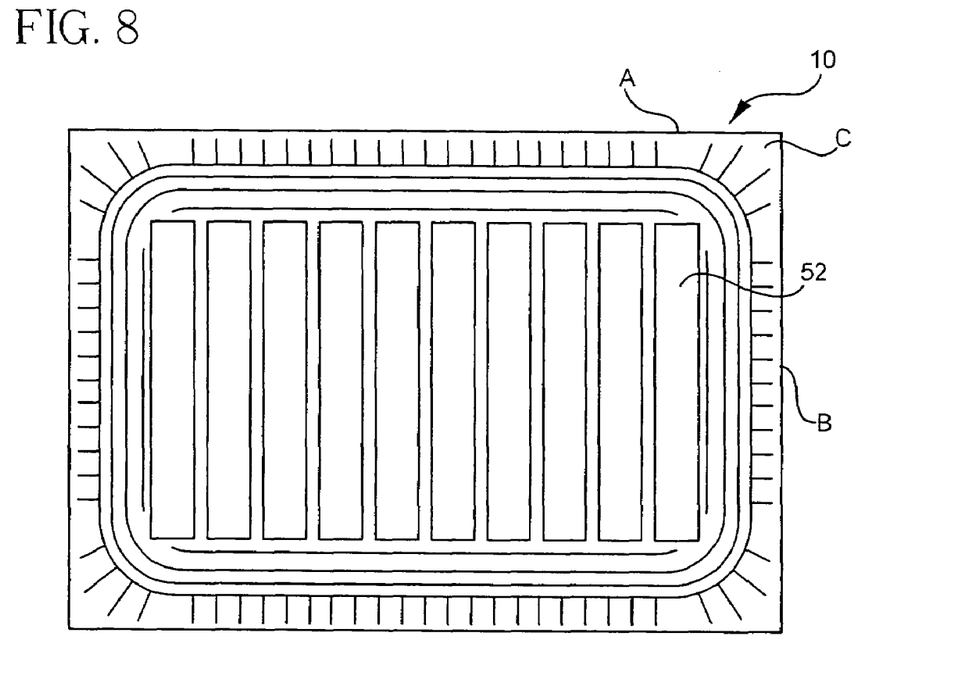
FIG. 8 is a schematic top view of the fourth embodiment of the electrolyte sheet.

FIG. 8 illustrates an electrolyte sheet 10 of a fourth embodiment of the present invention. This electrolyte sheet 10 of this embodiment also includes the stress relief area 22 which includes two sets of corrugated patterns. This embodiment of the present invention is similar to that of the third embodiment, but the inner most parallel and rounded fold sections corresponding to the corner areas C of FIG. 6 have been shifted outwards to provide slightly more area for printing multiple anode/cathode pairs on the electrolyte sheet 10.

The specific undulation shape of the corrugation pattern and the size and pitch of the folds 30, 30' should be determined by the stresses acting on the electrolyte sheet and the thermal expansion coefficients of the various materials (frame, sealant, electrodes, current collectors, etc.). The number of folds, fold height, pitch and specific curvatures of fold undulations in the stress relief area(s) 22 will determine the amount of available strain/stress relief. The maximum strain relief is in direction perpendicular to direction of corrugation trough (i.e., perpendicular the axis of the folds). Preferably, the folds should be between 50 um and 1 cm high (peak-to-valley), more preferably between 0.1 and 0.8 cm and most preferably less than 0.5 cm in height. The fold pitch P (i.e. the distance between two heights or two lows) is between 50 um and 5 cm, preferably between 0.1 cm and 2 cm and more preferably less than 1 cm. Corrugations that are too high (larger than 0.5 cm) may interfere with some subsequent processing operations, for example, electrode printing. However, if the corrugations are too small, the electrolyte sheet 10 may reach its fracture point (most likely on a tensile region) without getting adequate relief from the compensatory stretching/construction of the electrolyte sheet 10 in the stress-relief area. Thus, for thin electrolyte sheets (for example, less than 45 µm thick) it is preferable that the ratio of fold height H the thickness t of the electrolyte sheet 10 be at least 2 and more preferably at least 2.5 and most preferably 3 or higher. It is noted that the amount of stress/strain relief provided by the stress-relief area(s) 22 depends on the strength of the electrolyte sheet material and the thickness of the electrolyte sheet 10 at the stress-relief area 22.

According to the above described embodiments, the electrolyte sheet 10 has an average thickness t greater than 5 micrometers and less than 100 micrometers. It is preferable that the average thickness be below 45 micrometers and most preferable that the average thickness t is below 25 micrometers.

Furthermore, the electrolyte sheet 10, including the stress-relief areas may also be micro textured. For example, it may include multiple indentations, 5 micrometer or smaller in depth. It is preferable that for thin electrolyte sheets the indentations of the microtecture be less than ½ of the sheet thickness. For example, if the sheet thickness is 8 µm, it is preferred that the indentations are less than 4 µm deep. These indentations may be periodically arranged on the surface of the electrolyte sheet 10. However, the indentations may also be in a non-periodic arrangement.

Figure 9:
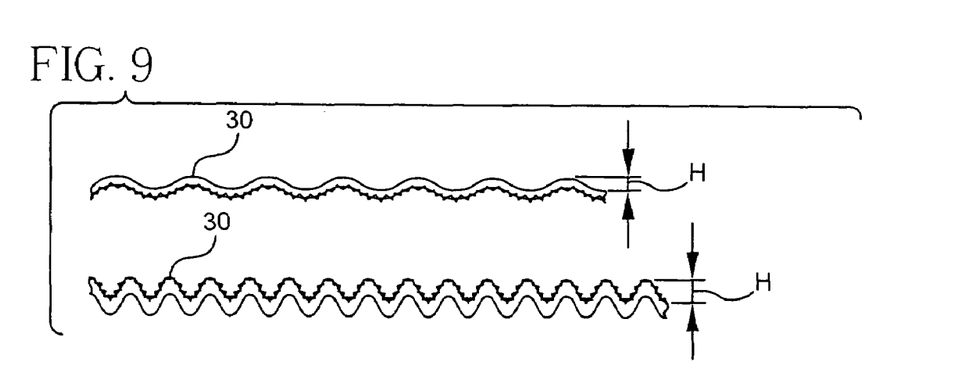
FIGS. 9-11 illustrate schematically different fold configurations.
Figure 10:
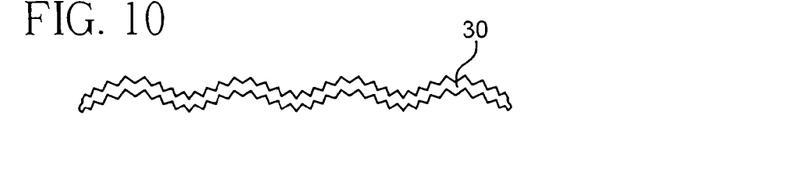
Figure 11:
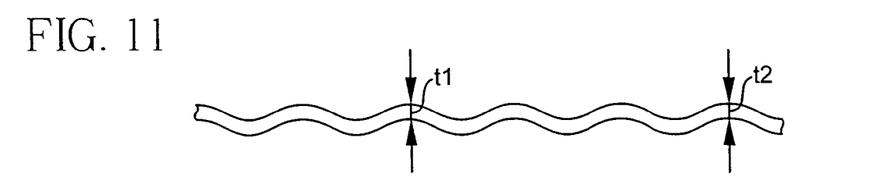

A cross-section of a portion of the electrolyte sheet 10 is illustrated schematically in FIG. 9. The folds 30 may be wider than they are deep and may be spaced apart by distances greater than their height. Alternatively, the folds 30 may be spaced apart by distances equal to or smaller than their height H. This is shown schematically, for example, in FIG. 9. As described above, the folds 30, 30' may also be micro-textured on either one or both sides, as shown in FIGS. 9 and 10. For example, folds 30 may have an average height of 50 micrometers or greater and may include grooves or other structure (for example, 0.5 micrometers deep) on one or both surfaces. Finally, the thickness of the electrolyte sheet 10 may also vary, depending on location on the electrolyte sheet, for example to minimize stress due to different temperatures and/or different amounts of fuel/oxygen pressure on different portions of the electrolyte sheet. More specifically, an electrolyte sheet, when utilized in a fuel cell, will typically be operated with much higher flow of air, compared to fuel flow. This is done to supply sufficient oxygen from the air to the fuel cell assembly. The airflow may create a greater stress in some areas of the electrolyte sheet; for example, in middle region of the electrolyte sheet.

An embodiment of the electrolyte sheet 10 that is especially suited to operate in such environment is illustrated schematically on FIG. 1. As other electrolyte sheets examples disclosed above, this electrolyte sheet includes thicker and thinner areas. However, in the electrolyte sheet of this embodiment, the thinner areas become progressively thinner closer to the edges. That is, because some regions of the electrolyte sheet (such as the center, for example) experience higher stresses when pressurized, it is advantageous that these regions of the electrolyte sheet have larger average thickness than the regions experiencing less stress.

Figure 12:
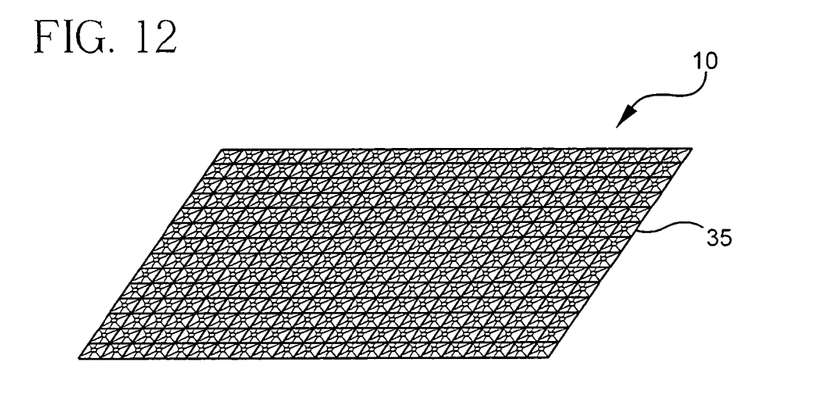
FIG. 12 illustrates schematically a fifth embodiment of the electrolyte sheet of the present invention.
Figure 13A:
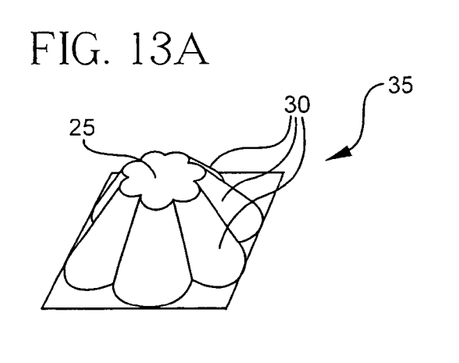
FIG. 13A illustrates schematically a unit cell of the electrolyte sheet of FIG. 12.
Figure 13B:
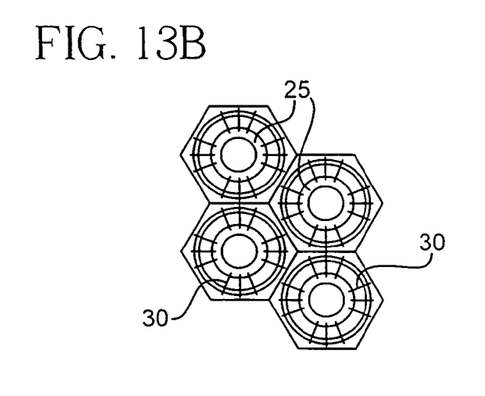
FIG. 13B illustrates schematically a top view of four unit cells arranged in a hexagonal orientation.

FIG. 12 illustrates an electrolyte sheet 10 of a fifth embodiment of the present invention. In this example, almost the entire electrolyte sheet 10 is patterned with multiple unit cells 35, each unit cell 35 having the shape of a dimple or a dome with folded sides 37. The folds 35 are directed to a common central area 25 of each of their respective unit cell 35. More specifically, the folds 30 which are arranged around and are directed longitudinally toward a common central area of each dimple or dome. FIG. 13A illustrates schematically an example of one of the unit cell 35 utilized in this embodiment. In this example, the unit cells 35 are arranged in rectangular pattern, covering almost the entire area of the electrolyte sheet 10. Thus, almost the entire area of the electrolyte sheet 10 of this embodiment acts as a stress-relief area. The unit cells 35 may also be arranged in hexagonal, square, triangular or other patterns to cover the electrolyte sheet 10. FIG. 13B illustrates schematically a top view of four unit cells arranged in hexagonal orientation. The patterned area may be either a small area of the electrolyte sheet 10, or may cover the entire electrolyte sheet 10. If the large area of the electrolyte sheet 10 is patterned in this manner, the depth of the dimples or the height of the domes should be relatively small, to enable printing of electrodes and other components on the electrolyte sheet 10. Thus, if most of the electrolyte sheet 10 is patterned in this manner, it is preferable that the depth of he dimples or the height D of the domes be less than 3 mm, and more preferably, less than 1 mm. The average height H of the folds 30 (peak-to-valley) is about half or less and preferably ⅓ or less of the dimple height. It is also preferable that the pitch of the folds is less than the length of the unit cell, preferably ½ or less than the length of the unit cell. It is preferred that the folds 30 have the highest height at the base of the unit cells and taper to nothing at their respective common central areas 25. This geometry allows the edges of the unit cells to stretch as needed, while dimple or the dome is getting flatter, thus providing the stress relief during temperature changes. It is noted that a pattern utilizing a combination of pleated dimples and domes may also be utilized.

Figure 14:
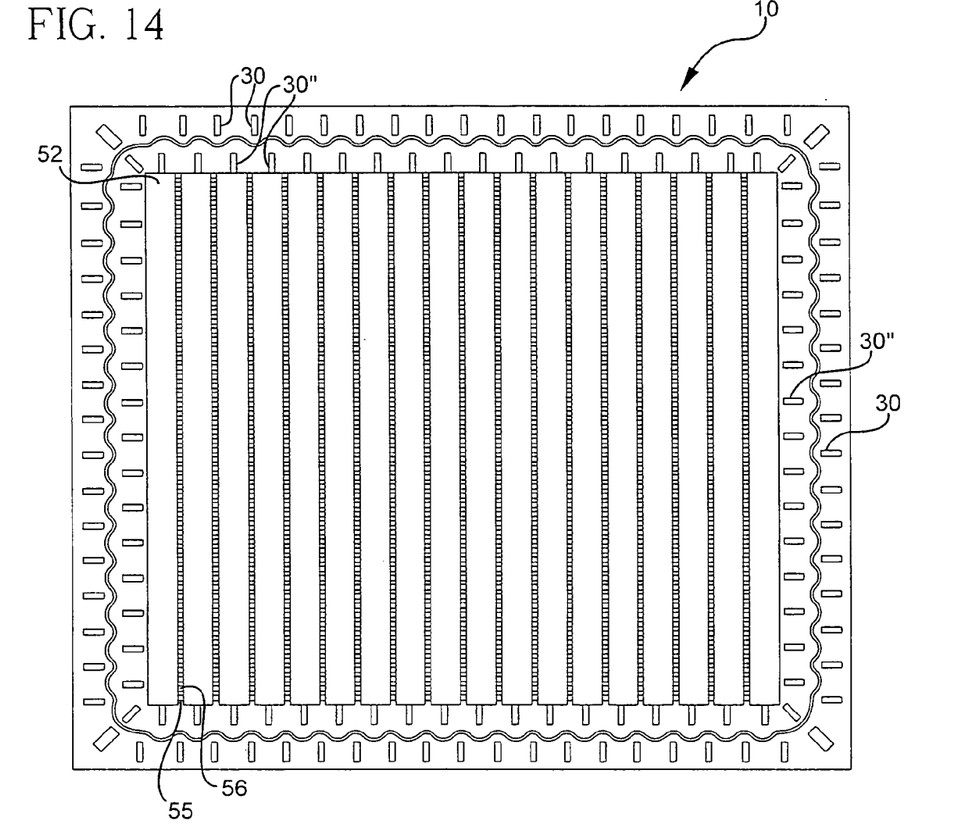
FIG. 14 illustrates schematically a top view of the sixth embodiment of the electrolyte sheet.

FIG. 14 illustrates a sixth embodiment of the present invention. The electrolyte sheet 10 of this embodiment has the stress relief area 22 which includes an interleaved corrugation pattern. More specifically, the stress relieve area 22 of the electrolyte sheet 10 has a series of folds 30, similar to that of the first embodiment. The stress relieve area 22 also has a second set of folds 30" interleaved with the first set of folds 30, such that the peaks of the set of folds 30 correspond to the valleys of the second set of folds 30". In this embodiment the lengths of the folds 30 and 30" is about ⅛ of the width of the electrolyte sheet 10.

The folds 30, 30" reduce the electrolyte sheet's susceptibility to breakage due to strain and stress which results from rapid temperature cycling and large (200° C. or more) temperature changes, as well as due to the thermal gradients across the electrolyte sheet 10. This improvement in mechanical properties of the electrolyte sheet 10 advantageously enables the electrolyte sheet 10 to operate at under higher temperature gradients, withstand higher and more rapid temperature fluctuations.

The electrolyte sheet 10 is has a substantially non-porous (i.e., substantially without closed pores, porosity being less than 5%) body. It is preferable that porosity is less than 3% and more preferable that porosity is less than 1%. The electrolyte sheet 10 preferably has an average thickness t that is greater than 4 micrometers and less than 100 micrometers, preferably less than 45 micrometers, more preferably between 4 micrometers and 30 micrometers, and most preferably between 5 micrometers and 25 micrometers. Lower average thickness is also possible. The lower limit of thickness is simply the minimum thickness required to render the structure amenable to handling without breakage. It is preferable that the total thickness of the electrolyte sheet and the electrodes is less than 150 μm. It is preferable that the electrolyte sheet body is a monolithic body (i.e., a body produced as one piece instead of multiple layers of different porosity that have been sintered together). It is also noted that the corrugated electrolyte sheets may be utilized in solid oxide fuel cells that are either electrolyte or are anode or cathode supported.

The thin, corrugated electrolyte sheets such as those described above can be advantageously utilized in the manufacture of solid oxide fuel cells. Thus, according to one embodiment of the present invention a solid oxide electrode/electrolyte assembly 50 of a fuel cell comprises: an electrolyte sheet 10 with a substantially non-porous body, the electrolyte sheet 10 having at least one stress-relief area arranged around a common central area 25 of the electrolyte sheet 10. The common central area includes: (i) at least one cathode disposed on a first surface of the electrolyte sheet; and (ii) at least one anode disposed opposite the cathode on a second surface of the electrolyte sheet. The stress-relief area has a surface with a plurality of folds 30. The plurality of folds 30 are arranged around and directed longitudinally toward the common central area 25. This is illustrated in FIGS. 14 and 15.

Figure 15:
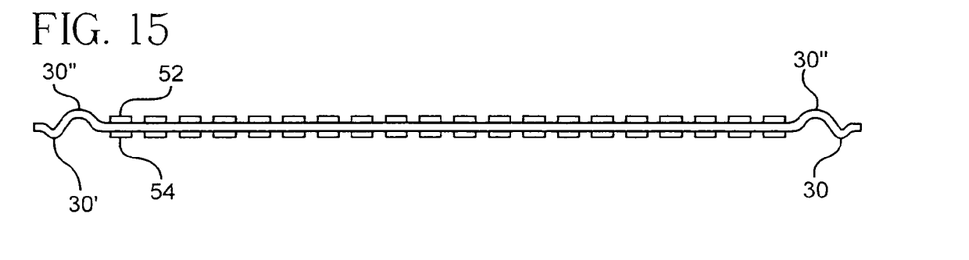
FIG. 15 is a cross-sectional view of the electrolyte sheet of FIG. 14.

More particularly, FIGS. 14 and 15 illustrate two views of self supporting zirconia-3 mole % yttria electrolyte sheet 10 supporting electrodes 52, 54 in the form of rectangular segments connected through small vias (holes) 56 in the electrolyte sheet 10. The top plane of the electrode-electrolyte assembly is shown in FIG. 14. FIG. 15 is a schematic elevational cross sectional view of a five-cell section of the electrode-electrolyte assembly shown in FIG. 14. According to this embodiment the electrode/electrolyte assembly 50 includes a plurality of anode-cathode pairs 52, 54. The anode-cathode pairs 52, 54 are separated from one another by via galleries 55. The via galleries 55 include a plurality of interconnects (called "via interconnects") 56' situated in the vias 56. These interconnects 56' conduct electronic current from the anode of one cell to the cathode of an adjacent cell.

Thin electrolyte sheets can be formed in the green state in a molded configuration and subsequently sintered to form an electrolyte sheet with a large measure of flexibility. Preparation of green (unfired) material is known in the art and is described, for example in U.S. Pat. No. 4,710,227. More specifically, this patent discloses the preparation of thin flexible "green" (unfired) tapes from solutions, the tapes being coated and cut, stacked and fired to form thin-dielectric capacitors. This type of process is further described in published European applications EP 0302972 and EP 0317676. Thus, in order to manufacture a thin electrolyte sheet with a corrugated stress relieve area, a thin sheet or layer comprising the green (pre-ceramic) material, is first produced. The green material is then sintered to provide a textured, sintered ceramic sheet with a flexibility sufficient to permit a high degree of bending without breakage under an applied force. Flexibility in the sintered ceramic sheets is sufficient to permit bending to an effective radius of curvature of less than 20 centimeters or some equivalent measure, preferably less than 5 centimeters or some equivalent measure, more preferably less than 1 centimeter or some equivalent measure.

By an "effective" radius of curvature is meant that radius of curvature which may be locally generated by bending in a sintered body in addition to any natural or inherent curvature provided in the sintered configuration of the material. Thus, the resultant curved sintered ceramic electrolyte sheets can be further bent, straightened, or bent to reverse curvature without breakage.

The flexibility of the electrolyte sheet will depend, to a large measure, on layer thickness and geometry of its folds and, therefore, can be tailored as such for a specific use. Generally, the thicker the electrolyte sheet the less flexible it becomes. In some exemplary embodiments thin electrolyte sheets are flexible to the point where toughened and hardened sintered ceramic electrolyte sheet 10 may bend without breaking to the bent radius of less than 10 mm. Such flexibility is advantageous when the electrolyte sheet 10 is used in conjunctions with electrodes and/or frames that have dis-similar coefficients of thermal expansion and/or thermal masses.

The corrugation of the electrolyte sheet 10 can be accomplished in various manners prior to sintering of the electrolyte sheet 10. For example, electrolyte sheets 10 with corrugated stress relieve area (s) can be produced by providing a green sheet of solid, negative ion-conducting (e.g., $O^-$) pre-ceramic material (for example, zirconia-3 mole % yttria, referred to herein as 3YSZ), forming a plurality of folds thereby creating at least one stress relief area, and then sintering the green sheet to provide a solid ion conductive electrolyte sheet 10 with a corrugated pattern. It is preferable that the sintering is done at temperatures above 1000° C., more preferably above 1300° C., for about 1-3 hours. For example, a method of making an electrolyte sheet 10 includes the steps of: (a) providing a green pre-ceramic sheet; (b) patterning the green pre-ceramic sheet such that it has a corrugation pattern containing multiple folds arranged around at least one common central area, (c) sintering the corrugated, green pre-ceramic sheet to provide an electrolyte sheet with a substantially non-porous body, the non-porous body having a corrugated surface with multiple folds therein.

The corrugation patterning step may be achieved, for example, by molding or embossing when the green sheet is placed in a suitable mold or die to form desired surface folds or cell structures with folds. Alternatively, sufficiently thin ceramic sheets can be also reformed through a process of superplastic deformation at high temperatures below their melting points. However, more effective and economic electrolyte sheet patterning can be achieved through the process of reshaping unfired green sheet at or near room temperature (20° C.) prior to sintering. However, the electrolyte sheet may also be patterned at a higher temperature, for example, 50° C., 75° C., 100° C., 150° C. or 200° C.

Figure 16:
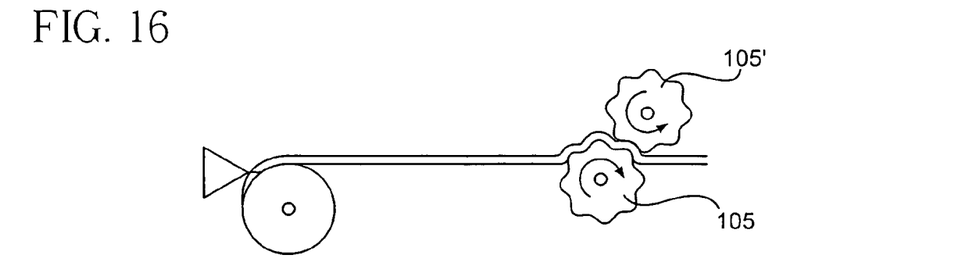
FIG. 16 illustrates schematically a method of making corrugated electrolyte sheets.

There are several methods of producing the desired patterns in a flexible ceramic. One method is to run a cast, but unfired, green sheet or tape through embossing rollers. At least one of these rollers 105, 105' is patterned with folds. This is illustrated schematically in FIG. 16. The high areas of the rollers 105, 105' will stretch or squeeze the green pre-ceramic, thinning some areas. When working with green (i.e., unfired) pre-ceramic sheets of 15 to 30 micrometers thick, it is preferable to have the green pre-ceramic material run through the two rollers while on a substrate that is as thick or thicker than the green sheet. The green sheet may be also placed between two polymer carrier sheets during embossing.

The preferred electrolyte sheets 10 are formed of a polycrystalline ceramic selected from a group comprising of ion conductors, preferably oxygen ion conductors such as partially stabilized zirconia or stabilized zirconia, the partially stabilized, or stabilized zirconia, being doped with a dopant selected from the group comprising of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. The crystalline geometries of zirconia such as tetragonal, monoclinic, and/or cubic and their combinations are all important physical parameters of this structural material. It is most preferable that partially stabilized zirconia is utilized because of its transformation toughening property. The tetragonal phase transforms into monolithic phase under stress and effectively prevents crack formation and propagation. Thus, the electrolyte sheet is more durable, mechanically strong and easier to handle. The more preferable stabilizing dopants are Y, Yb, Ca, Mg, or Sc. Of these dopants Sc, Yb and Y have excellent ionic conductivity. Ceramic sheets can be made tougher by selecting certain toughening agents known to those skilled in this art. Particularly useful and preferred toughening agents are the oxides of tantalum and niobium which can be advantageously added to the above stabilizers.

The preparation of a green 3YSZ based sheet can involve some form of casting an appropriate ceramic slip. One such slip is described in the following example.

EXAMPLE 1

Preparation of a Ceramic Slip.

A ceramic slip is made containing 100 grams of zirconia powder using the components shown in Table 1, below.

TABLE 1

Components of Slip Batch

| Component | Manufacturer | Form | Function | Batch mass |
|---|---|---|---|---|
| Zirconia TZ-3Y | Tosoh | powder | ceramic | 100.0 g |
| Ethanol | Mallinkrodt | liquid | solvent | 36.36 g |
| 1-Butanol | Fisher | liquid | solvent | 8.79 g |
| Propylene Glycol | Fisher | liquid | solvent | 2.00 g |
| Water (distilled) | | liquid | solvent | 2.50 g |
| Emphos PS-21A | Witco | liquid | dispersant | 1.00 g |

All ingredient bottles are kept tightly closed until used to reduce water pickup. A 250 ml Nalgene® polyethylene plastic container is cleaned by rinsing twice with about 10-20 ml of ethanol or methanol. The container is then placed in a 70° C. drying oven to evaporate the alcohol. After drying, the container and lid are weighed. The zirconia powder is weighed out in a weighing boat and set aside. The ethanol is pipetted into the dried Nalgene container. The 1-butanol is then pipetted into the plastic container. Subsequently, propylene glycol is pipetted into the container. Finally, the water and, then, the Emphos PS-21A are pipetted into the container. About 450 grams of 10 mm Tosoh TZP-3Y milling media is weighed out and the weight recorded. The media is then added to the container and the container is gently shaken. The zirconia powder is then added from the weighing boat. The lid is replaced onto the container and tightened. The closed container is re-weighed and the total weight of solvents, powder, and dispersant is calculated. The slip is then subjected to vibratory milling for 72 hours, after which the viscosity of the slip is measured.

Two settling steps are performed in order to remove the coarse grains and narrow the grain size distribution in the slip. A double settling technique provided a good grain size distribution with acceptable material losses.

A second 125 ml Nalgene® plastic container and lid are washed and dried as above. The second container and lid is weighed and the weight recorded. The slip from the milling container is poured into the second container, leaving the milling media in the original container. The slip and second container with lid is then weighed. The coarse grains are allowed to settle out of the slip for 72 hours. A third container and lid are washed, dried, weighed, and the weight recorded. Carefully, the unsettled slip is pipetted into the third container, being careful not to pick up any of the settled sediment. The pipetted slip with the third container with lid are weighed. This slip is then allowed to settle for an additional 24 hours. The residue/sediment in the second container is dried in a ventilated oven at about 90° C. for at least three hours and the dried residue and container plus lid are weighed.

A fourth 125 ml plastic container and lid are washed and dried as above. The weight of this fourth lid and container is then recorded. Again, the slip from the third (24 hour settling) container is pipetted into the fourth container, being careful not to pick up any of the settled residue with the pipette. The fourth container and slip are weighed and the weight recorded. The reside is dried in the third container, as above, and then weighed. From the recorded weights, it can be determined how much ceramic powder is left in the fourth container.

A weak flocculating agent, glacial acetic acid, a plasticizer, and a binder are added to the ceramic powder present in the remaining slip. The components used for flocculation and binding, reported in weight percent in excess of the weight of the remaining ceramic powder, are shown in Table 2, as follows:

TABLE 2

Components Used For Flocculation and For Binder System

| Component | Manufacturer | Form | Function | Batch mass |
|---|---|---|---|---|
| Glacial Acetic Acid | Malinckrodt | liquid | flocculent | 1 wt % of remaining ceramic powder |
| Isopropyl alcohol | Fisher | liquid | acid dilution | 1 wt % |
| Dibutyl-Pthalate | Aldrich | liquid | plasticizer | 3.5 wt % |
| Polyvinyl Butyral | Monsanto | powder | binder | 6 wt % |

A 50/50 wt % solution of glacial acetic acid in isopropyl alcohol is made. 2 wt % (in excess of the weight of the remaining ceramic powder) of this solution is pipetted into the slip in the fourth container. The lid is replaced and the container is gently shaken.

Next, 3.5 wt % (in excess of the weight of the remaining ceramic powder) of dibutyl-pthalate is pipetted into the slip in the fourth container. The lid is replaced and the container is gently shaken. Using a weighing boat, 6 wt % (of the remaining ceramic powder) of polyvinyl butyral is weighed out and poured into the slip. The lid is replaced and the container is gently shaken. This container is then placed on a paint shaker type of device for at least 15 minutes to fully dissolve the binder. Two clean zirconia milling media are put into the container and the container is placed on a roller mill at low speed for three days.

The slip is cast on a Teflon™ substrate or film and then is dry for about 5 to 30 minutes. If the green film is dried too rapidly (for example, less than 1 minute) the ceramic sheet will curl on sintering. After the green sheet is dried, it can be vacuum formed over a metal or plastic mold that has been heated to 75° C.-150° C., preferably about 120° C. with a thin layer of Teflon between the green sheet and the mold. The edge of the mold has vacuum channels or, alternatively, small perforations for vacuum. The Teflon™ coating also has small holes aligned with the vacuum channels of the mold. A vacuum pump applies the vacuum through the vacuum pin(s), which pulls the green sheet onto the mold, forming the desired corrugation pattern(s).

A second thin 25 micron thick Teflon sheet is carefully placed on the green ceramic sheet and covers all the pin holes in the bottom Teflon and any other vacuum holes or channels. After forming the corrugations in the green ceramic sheet, the vacuum pump is shut off and the green ceramic sheet is carefully removed, top Teflon first, then ceramic. One must try to avoid buckling and deforming the corrugation. The ceramic sheet is then trimmed to size and sintered. Alternatively, after the top Teflon sheet is placed on the ceramic sheet, a second pressure chamber with a polymer gasket is placed over the top Teflon sheet. The gasket does not impinge on the ceramic sheet corrugations, but is outside the corrugated area. The pressure chamber is pressurized to 15-45 psi for a few seconds with air or $N_2$. The pressure is released and the top Teflon then the corrugated green ceramic sheet removed. It is envisioned that this technique can be easily automated with roll-to-roll processing.

EXAMPLE

The invention will be further clarified by the following example.

The electrolyte sheet 10 of FIG. 1 was made as follows:
 i. In a filtered air "clean" environment, 125 micron thick Teflon® film is smoothed out on a glass plate and then attached to the glass plate with tape.
 ii. A slip of zirconia-3 mole % yttria powder is coated on the Teflon® coated cloth using a tape casting "doctor" blade with a 50 micron gap and a 15 cm width, forming a green pre-ceramic sheet.
 iii. The sheet was dried for ½ hour at room temperature under a plastic cover that encased the drying green pre-ceramic sheet, with about a 2 mm gap along the width of the ceramic sheet but no gap along the long edges.
 iv. The green sheet was then dried in an oven at 60° C. for 1 hour.
 v. The green sheet is then corrugated, for example using the vacuum forming method described above, with a mold having a corrugation pattern corresponding to the electrolyte sheet 10 of FIG. 6.
 vi. Finally, the corrugated green sheet was sintered at 1430° C. for 2 hours.

After sintering, the corrugations of the electrolyte sheet 10 was observed via unaided eye. The optical observation showed that the maximum height of the folds 30 was about 1 mm and the folds were arranged in the corrugation pattern shown in FIG. 1.

An anode ink, to provide a multiple cell pattern as in FIG. 8, was screen printed on the flat portion of the sintered electrolyte sheet 10 (i.e., on the common central area situated between the folds 30). After drying at 150° C. for about a few minutes, the printed anode on the sheet was sintered for 30 minutes to 2 hours between about 1350° C. to 1450° C.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An electrolyte sheet, comprising: a substantially non-porous body, said electrolyte sheet having at least one stress-relief area on at least a portion of said electrolyte sheet, said stress-relief area having surface with a plurality of folds, said plurality of folds arranged around and directed toward a common central area on the surface of said electrolyte sheet with the axes of the folds being straight and correspond to the valleys or peaks of the folds, said axes being directed toward the common central area.

2. The electrolyte sheet of claim 1, wherein the electrolyte sheet is a ceramic sheet formed of a polycrystalline ceramic selected from a group consisting of partially stabilized zirconia or stabilized zirconia, and being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof.

3. The electrolyte sheet according to claim 1 wherein said stress relief area includes a plurality of unit cells, wherein each unit cell includes a plurality of folds arranged around and directed longitudinally towards a common central area of said unit cell.

4. The electrolyte sheet of claim 1, wherein said stress relief area includes at least two sets of folds.

5. The electrolyte sheet of claim 1, wherein said two sets of folds are interleaved such that the peaks of one set of folds correspond to valleys of the other set of folds.

6. The electrolyte sheet of claim 4 wherein a first set of folds arranged such that said folds of said first set are arranged around and directed longitudinally towards said common central area and a second set of folds runs substantially parallel to electrolyte sheet's edges.

7. The electrolyte sheet of claim 1, wherein said electrolyte sheet has an average thickness greater than 5 micrometers and less than 100 micrometers.

8. The electrolyte sheet of claim 1, wherein said average thickness is below 45 micrometers.

9. The electrolyte sheet of claim 1, wherein said average thickness is below 25 micrometers.

10. The electrolyte sheet of claim 3, wherein said unit cells are arranged in a periodic manner.

11. A solid oxide fuel cell device having the electrolyte sheet of claim 1 and further comprising at least one anode and at least one cathode.

12. The solid oxide fuel cell device according to claim 11 wherein the overall thickness of the electrolyte and anode and cathode is less than 150 microns.

13. The solid oxide fuel cell device according to claim 11 wherein said fuel cell device comprises a plurality of anode/cathode pairs.

14. The solid oxide fuel cell device according to claim 13 wherein the overall thickness of each of said pluralities of anode/cathode pairs and the electrolyte sheet is less than 150 µm.

* * * * *